(12) United States Patent
Leah et al.

(10) Patent No.: US 10,897,056 B2
(45) Date of Patent: *Jan. 19, 2021

(54) ELECTROLYTE FORMING PROCESS

(71) Applicant: Ceres Intellectual Property Company Limited, Horsham (GB)

(72) Inventors: Robert Leah, Horsham (GB); Adam Bone, Horsham (GB); Carl Matthews, Horsham (GB); Mike Lankin, Horsham (GB); Mahfujur Rahman, Horsham (GB)

(73) Assignee: Ceres Intellectual Property Company Limited, Horsham (GB)

(*) Notice: Subject to any disclaimer, the term of this patent is extended or adjusted under 35 U.S.C. 154(b) by 598 days.

This patent is subject to a terminal disclaimer.

(21) Appl. No.: 14/672,315

(22) Filed: Mar. 30, 2015

(65) Prior Publication Data
US 2016/0233535 A1  Aug. 11, 2016

(30) Foreign Application Priority Data
Feb. 6, 2015 (GB) .................................. 1502032.4

(51) Int. Cl.
*H01M 8/12* (2016.01)
*H01M 8/126* (2016.01)
(Continued)

(52) U.S. Cl.
CPC ............. *H01M 8/126* (2013.01); *B32B 18/00* (2013.01); *C04B 35/50* (2013.01);
(Continued)

(58) Field of Classification Search
CPC .......... H01M 8/24; H01M 2008/1293; H01M 8/124–1266; Y02P 70/56; Y02E 60/525
(Continued)

(56) References Cited

U.S. PATENT DOCUMENTS 6,709,628 B2  3/2004 Kleinlogel et al.
9,246,184 B1  1/2016 Batawi et al.
(Continued)

FOREIGN PATENT DOCUMENTS

CN  102544559 A  7/2012
EP  1699104 A1  9/2006
(Continued)

OTHER PUBLICATIONS

J.W. Phair et al. "Characteristics of cerium-gadolinium oxide (CGO) suspensions as a function of dispersant and powder properties" 2009, vol. 341, Physiochem. Eng., 103-109 (Year: 2009).*

(Continued)

*Primary Examiner* — Victoria H Lynch
(74) *Attorney, Agent, or Firm* — Snell & Wilmer L.L.P.

(57) ABSTRACT

A process for forming an electrolyte for a metal-supported solid-oxide fuel cell, the process comprising:
a. combining a doped-ceria powder with a sintering aid and solvent to form a slurry;
b. applying the slurry to an anode layer;
c. drying to form a green electrolyte; and
d. firing the green electrolyte to form a sintered electrolyte;
wherein the slurry in step b. comprises doped-ceria powder with a physical property selected from bimodal particle size distribution, a BET surface area in the range 15-40 m$^2$/g, a spherical morphology, or combinations thereof together with an electrolyte obtained by the process, a fuel cell and fuel cell stack, comprising the electrolyte, and the use of the fuel in the generation of electrical energy.

16 Claims, 7 Drawing Sheets

(51) Int. Cl.
  *H01M 8/1213* (2016.01)
  *C04B 35/50* (2006.01)
  *B32B 18/00* (2006.01)
  *C04B 35/626* (2006.01)
  *H01M 8/24* (2016.01)
  *H01M 8/1226* (2016.01)
  *H01M 8/124* (2016.01)

(52) U.S. Cl.
  CPC ....... *C04B 35/6261* (2013.01); *H01M 8/1213* (2013.01); *H01M 8/24* (2013.01); *C04B 2235/3224* (2013.01); *C04B 2235/3229* (2013.01); *C04B 2235/3277* (2013.01); *C04B 2235/3281* (2013.01); *C04B 2235/442* (2013.01); *C04B 2235/443* (2013.01); *C04B 2235/528* (2013.01); *C04B 2235/5409* (2013.01); *C04B 2235/5436* (2013.01); *C04B 2235/5445* (2013.01); *C04B 2235/5472* (2013.01); *C04B 2235/5481* (2013.01); *C04B 2235/608* (2013.01); *C04B 2235/6562* (2013.01); *C04B 2235/6567* (2013.01); *C04B 2235/77* (2013.01); *C04B 2237/34* (2013.01); *H01M 8/1226* (2013.01); *H01M 2008/1293* (2013.01); *H01M 2300/0074* (2013.01); *H01M 2300/0094* (2013.01); *Y02E 60/50* (2013.01); *Y02P 70/50* (2015.11)

(58) Field of Classification Search
  USPC .......................................................... 429/465
  See application file for complete search history.

(56) References Cited

U.S. PATENT DOCUMENTS

| | | | |
|---|---|---|---|
| 2002/0028367 A1 | 3/2002 | Sammes | |
| 2002/0048699 A1* | 4/2002 | Steele ................. | H01M 8/2483 |
| | | | 429/465 |
| 2003/0027033 A1* | 2/2003 | Seabaugh .......... | C04B 41/5036 |
| | | | 429/489 |
| 2005/0119108 A1* | 6/2005 | Suda .................... | C01F 17/0043 |
| | | | 501/126 |
| 2005/0181253 A1* | 8/2005 | Finnerty ............. | H01M 4/8621 |
| | | | 429/482 |
| 2006/0197264 A1 | 9/2006 | Cutler | |
| 2006/0231402 A1* | 10/2006 | Clasen .................. | C25D 13/02 |
| | | | 204/471 |
| 2007/0077476 A1 | 4/2007 | Lee | |
| 2009/0098436 A1 | 4/2009 | Yamada | |
| 2011/0143038 A1 | 6/2011 | Bone | |
| 2012/0094214 A1 | 4/2012 | Zahid et al. | |
| 2013/0189605 A1 | 7/2013 | Song et al. | |
| 2014/0004446 A1* | 1/2014 | Yoon ....................... | C04B 35/50 |
| | | | 429/495 |
| 2014/0170532 A1 | 6/2014 | Ohtani et al. | |

FOREIGN PATENT DOCUMENTS

| | | |
|---|---|---|
| EP | 2679563 | 1/2014 |
| JP | 2004107186 | 8/2004 |
| JP | 2006139960 | 10/2004 |
| JP | 2006518807 A | 8/2006 |
| JP | 2008226662 | 9/2008 |
| JP | 2009037872 A | 2/2009 |
| JP | 2009037874 | 2/2009 |
| JP | 2009525564 | 7/2009 |
| JP | 2010086705 | 4/2010 |
| JP | 2010182665 A | 8/2010 |
| JP | 2013201038 | 3/2013 |
| JP | 2014207215 A | 10/2014 |
| KR | 100833626 B1 | 5/2008 |
| KR | 20110046441 A | 5/2011 |
| KR | 20130050401 A | 5/2013 |
| KR | 101405477 | 6/2014 |
| RU | 2336369 C2 | 10/2008 |
| WO | 1998014825 A1 | 4/1998 |
| WO | 2007085863 | 8/2007 |
| WO | 2015016565 | 6/2016 |

OTHER PUBLICATIONS

Journal of Power Sources, vol. 124, 2003, Zhang et al, "Sinterability and ionic conductivity of coprecipitated Ce0.8Gd0.2O (2-[delta]) powders treated via a high-energy ball-milling process", pp. 26-33, May 19, 2003, Singapore.
International Search Report, dated Apr. 28, 2015.
Non-Final Office Action in U.S. Appl. No. 14/672,285 dated Feb. 26, 2019.
Office Action in Russian Patent Application No. 2017127685 dated Apr. 19, 2019.
Office Action in Korean Patent Application No. 10-2017-7024537 dated Apr. 30, 2019.
Office Action in Korean Patent Application No. 10-2017-7024528 dated Apr. 29, 2019.
Final Office Action dated Aug. 27, 2018 in the U.S. Appl. No. 14/672,285.
Non-Final Office Action dated Sep. 7, 2017 in the U.S. Appl. No. 14/672,285.
PCT; Office Action dated Oct. 16, 2018 in the International Application No. P343113JP.
Development of Porous Metal-Supported Solid Oxide Fuel Cells, McMaster University, MsC Thesis, (©) Copyright by Meng Ren, Aug. 2013.
Naoki Oishi et al. Evauation of Metal Supported Ceria Based Solid Oxide Fuel Cell Fabricated by Wet Powder Spray and Sintering, Journal of The Electrochemical Society, 157 (1) B125-B129 (2010).
Effect of characteristics of (Sm, Ce) O2 powder on the fabrication and performance of anode-supported solid oxide fuel cells. Materials Research Bulletin 47 (2012) 121-129.
Zhang et al., Study on Properties of LSGM Electrolyte Made by Tape Casting Method and Applications in SOFC, Journal of Rare Earths vol. 24, Issue 1, Supplement 1, Dec. 2006, pp. 90-92.
Canadian Office Action in the Canadian Application No. 2,974,772 dated May 30, 2019.
Canadian Office Action in the Canadian Application No. 2,974,773 dated Jun. 3, 2019.
Final Office Action in the U.S. Appl. No. 14/672,285 dated Aug. 22, 2019.
Non-Final Office Action dated Mar. 20, 2020 in U.S. Appl. No. 14/672,285.

* cited by examiner

ELECTROLYTE FORMING PROCESS

FIELD

The invention relates to a process for forming an electrolyte for a metal-supported solid-oxide fuel cell, in particular to a process for improving electrolyte density. Fuel cells, fuel cell stacks and uses are also described.

BACKGROUND

A solid oxide fuel cell (SOFC) is an electrochemical device for the generation of electrical energy through the electrochemical oxidation of a fuel gas (usually hydrogen-based). The device is ceramic-based, and uses an oxygen-ion conducting metal-oxide derived ceramic as its electrolyte. As ceramic oxygen ion conductors known in the art (most typically doped zirconium oxide or doped cerium oxide) only demonstrate technologically relevant ion conductivities at temperatures in excess of 500° C. (for cerium-oxide based electrolytes) or 600° C. (for zirconium oxide based ceramics), all SOFCs have to operate at elevated temperatures.

The electrolyte is an essential part of the cell, and has four main functions in an SOFC:
  Allowing the passage of electric current between the cathode (positive air electrode) and anode (negative fuel electrode) in the form of mobile oxygen ions.
  Blocking the passage of electric current between the electrodes in the form of electrons which would cause an internal short circuit within the cell
  Preventing the mixing of fuel and air, meaning the electrolyte needs to be at least 95% of theoretical density so there is no interconnecting porosity and hence the electrolyte layer is gas impermeable, and substantially free of defects.
  Some cells, such as the applicants cell as defined in GB 2,368,450), provide a gas tight edge seal by adhering to the metal substrate around one of the electrodes—nominally the anode, to prevent fuel side reactants and oxidant side reactants mixing in the vicinity of the cell electrochemistry.

Traditionally, SOFCs have been all-ceramic devices, with either the electrolyte or one of the electrodes providing the structural support for the cell. This approach has well-known drawbacks, summarised below, which have held back the widespread commercialisation of SOFC technology.

The relatively low ionic conductivity of zirconia-based electrolyte materials means that electrolyte-supported SOFC cells (ESC) need to operate at high temperatures (typically 850-1000° C.) in order to achieve practically useful power outputs, as the electrolyte needs to be relatively thick (>100 µm) and thus resistive in order to have sufficient mechanical strength. This presents challenges due to the high cost of materials for the stack and system components which will withstand continuous operation at such high temperatures.

A more recent development has been the anode-supported cell (ASC) where the structural part of the cell is the anode (usually a nickel-electrolyte material cermet composite), with an electrolyte film of <20 µm thickness. The thinner electrolyte of an ASC allows much lower operation temperatures in the range 650-800° C. The main issue with ASCs is their tendency to catastrophic failure if the nickel in the anode is allowed to oxidise to nickel oxide due to loss of fuel at operating temperature (such as can happen in the event of an uncontrolled shut-down event due to a technical failure of the system). If this happens the volume expansion upon reoxidation of the nickel will can cause stresses which cause the entire cell to crack.

Cathode supported cells are very difficult to manufacture due the relatively high thermal expansion coefficient of many SOFC cathode materials relative to the electrolyte, and the challenge of maintaining sufficient porosity at electrolyte firing temperatures.

Further, it is notoriously difficult to seal ceramic fuel cells into a stack in a manner which is not susceptible to damage due to stresses from thermal cycling and mechanical vibration.

A design of SOFC cell which avoids the issues above is the metal-supported SOFC design disclosed by Ceres Power (GB 2,368,450). This SOFC cell uses a ferritic stainless steel foil made partially porous in its central region to allow fuel access to the anode as its structural support. The mainactive cell layers (anode, electrolyte and cathode) are all deposited on top of the substrate foil typically as thick films.

The Ceres Power SOFC cell also allows operation at lower than usual temperatures. These can be in the range 450-650° C., and often operation temperatures are in the range 500-620° C. (the Ceres Power cell is therefore regarded as being a "low temperature solid oxide fuel cell", as opposed to a conventional solid oxide fuel cell which operate at temperatures in excess of 650° C., often in excess of 700° C.). This is achieved through the use of predominantly Cerium oxide (ceria)-based ceramic materials such as CGO10 ($Ce_{0.9}Gd_{0.1}O_{1.95}$) as the oxygen ion conducting electrolyte, which have an intrinsically higher oxygen ion conductivity than zirconia-based materials. A thin film of stabilised zirconia is deposited in the electrolyte to prevent internal short-circuiting of the cell due to the mixed ionic-electronic conductivity of ceria-based electrolytes, as disclosed in GB 2,456,445. As the zirconia layer is so thin, its resistance to oxygen ion transport is sufficiently low that low-temperature operation is still possible.

A major challenge in the manufacture of metal-supported SOFCs is the production of a dense, substantially defect-free doped-ceria electrolyte layer using a cost-effective process suitable for volume manufacture. The main issues to address if truly robust and efficient cells are to be produced are, the need to:
  Sinter the electrolyte layer to >95% of theoretical density at a temperature which will not result in excessive oxidation of the metal substrate (typically <1100° C. for Ceres Power designs which typically use ferritic stainless steel substrates).
  Sinter the electrolyte layer on a non-shrinking metal support. This means that sintering shrinkage is constrained to one dimension, a problem as shrinkage limitation during sintering is known to inhibit densification relative to unconstrained isotropic sintering.
  Develop a deposition method which avoids including or inducing defects in the ceramic layer.
  Doped ceria is known to be easier to sinter to full density than the zirconia typically used in SOFC electrolytes, which is advantageous for fabrication of metal supported cells. However, unlike zirconia, ceria can be reduced when exposed to a reducing atmosphere at elevated temperature, with the $Ce^{4+}$ ions partially reducing to $Ce^{3+}$ ions. This is known to result in an expansion of the crystal lattice of the material, which eventually results in the development of stresses in the ceramic electrolyte which are high enough to result in the failure of the electrolyte through cracking. This characteristic of ceria-based electrolytes precludes the use of reducing atmospheres to enable sintering of the electrolyte at very high temperatures without oxidising the steel, as has been reported for the production of metal-supported SOFCs with zirconia-based electrolytes. In addition, in order to facilitate low-cost volume manufacture and avoid problems with interaction between the nickel in the anode and the stainless steel support, it is highly desirable to sinter the electrolyte in air.

It is known that the densification of doped-ceria can be significantly enhanced by low-level addition of certain metal oxides, particularly cobalt oxide, copper oxide and lithium oxide.

The green density of a ceramic powder compact may be enhanced by the application of high pressure to the compact, to compact the powder as tightly as possible. Typical green densities of powder compacts after pressing are in the range 35-60% of theoretical density, depending upon the morphology and surface area of the powder.

The invention is intended to overcome or ameliorate at least some aspects of the above problems. Such that it can provide a process for producing an electrolyte which is dense, gas-tight, and may be fabricated on a ferritic stainless steel support using low-cost volume manufacturing methods.

SUMMARY

A process is generally provided for forming an electrolyte for a metal-supported solid-oxide fuel cell. In one embodiment, the process comprises: (a) combining a doped-ceria powder with a sintering aid and solvent to form a slurry; (b) applying the slurry to an anode layer, wherein the slurry comprises doped-ceria powder with a physical property selected from bimodal particle size distribution, a BET surface area in the range 15-40 $m^2/g$, a spherical morphology, or combinations thereof; (c) drying to form a green electrolyte; and (d) firing the green electrolyte to form a sintered electrolyte.

A process for forming a fuel cell is also generally provided, which can include forming an electrolyte on a metal-supported anode layer using the process described above, and applying a cathode material to the electrolyte. A fuel cell is also provided that comprises an electrolyte obtained by the process described above, as well as a fuel cell stack comprising at least of such two fuel cells.

BRIEF DESCRIPTION OF THE DRAWINGS

In order that the invention may be more readily understood, it will be described further with reference to the figures and to the specific examples hereinafter.

DETAILED DESCRIPTION

Figure 1:
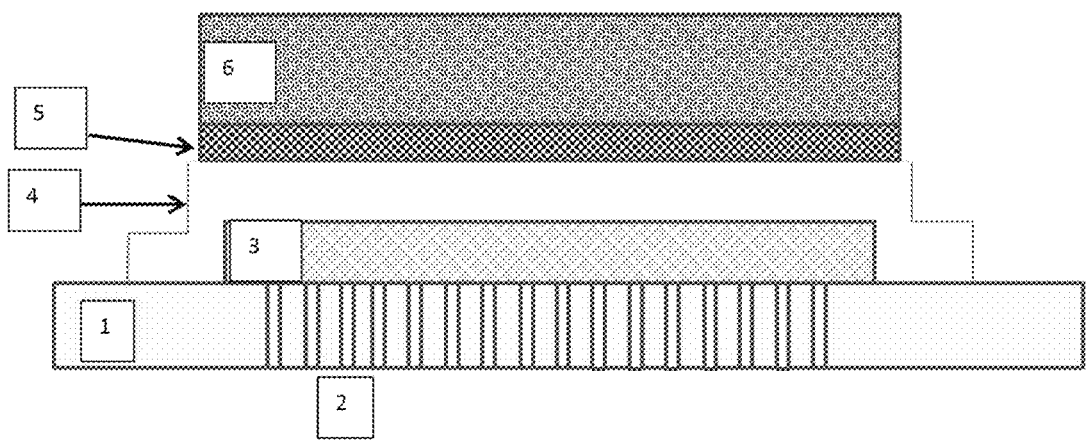
FIG. 1 is a schematic diagram of a fuel cell of the type disclosed in GB 2,368,450.
Figure 2:
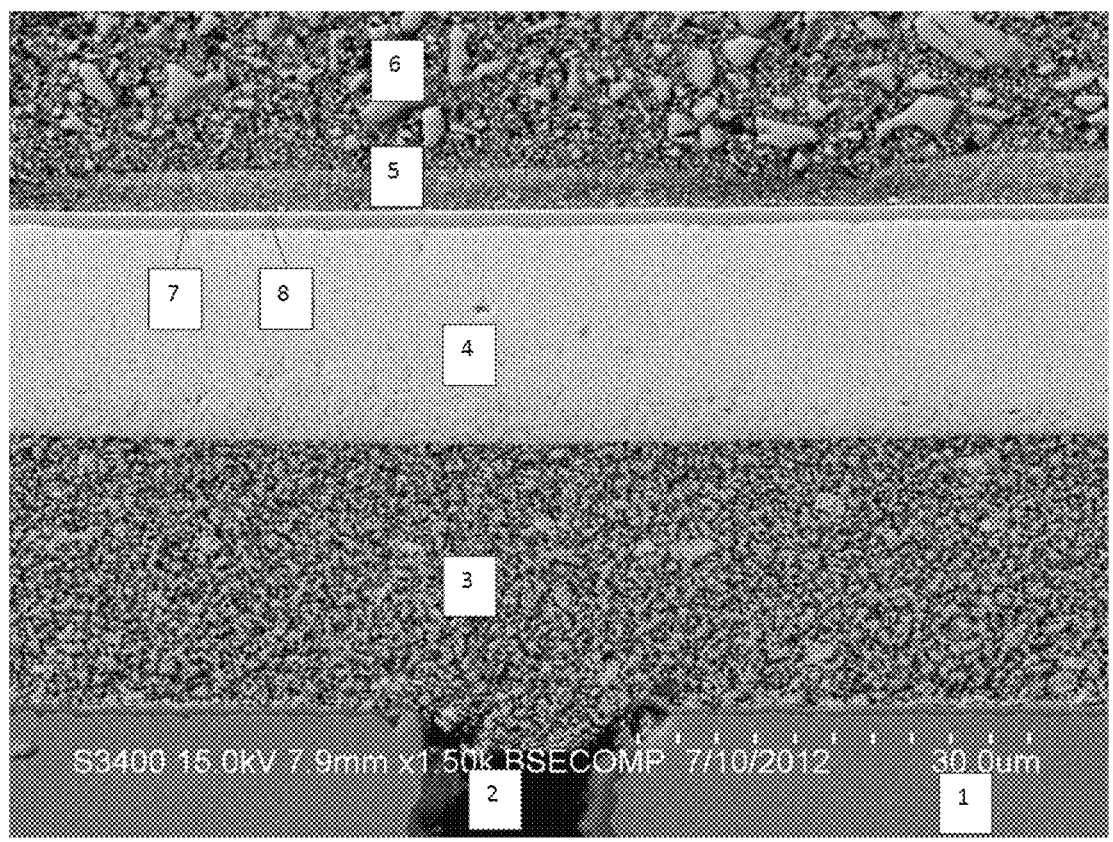
FIG. 2 is a SEM image of the fuel cell of FIG. 1, as disclosed in GB 2,368,450.

The prior art fuel cell of FIGS. 1 and 2 comprises a ferritic stainless steel substrate (1), made partially porous by laser-drilling thousands of holes though the central region of the substrate (2). The porous substrate is covered by an anode layer (3) covering the porous region of the substrate. Over the anode layer is deposited a CGO electrolyte layer (4), which overlaps the anode onto the undrilled area of the steel, thus forming a seal around the edge of the anode. The cathode has a thin active layer (5) where the reduction of oxygen takes place, and a thicker current collector layer (6) to allow current to be collected from the cell in a stack. FIG. 2 additionally shows a very thin stabilised zirconia layer (7) and an even thinner doped ceria layer (8), which blocks electronic conductivity and form the interface between the anode and electrolyte respectively.

Figure 3:
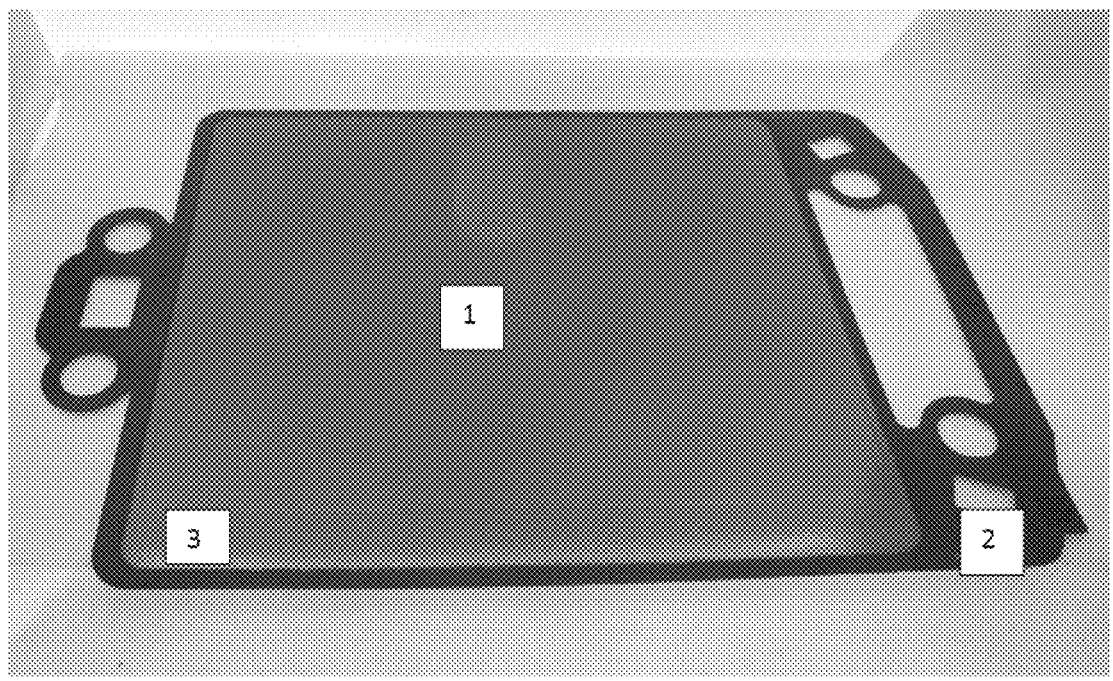
FIG. 3 is a half-cell manufactured in accordance with the invention.

FIG. 3 shows a half cell manufactured according to the process disclosed in this patent. A structure as disclosed in GB 2,368,450 can be seen, with an anode region (1) in which the metal substrate is made porous by laser drilling, an outer region (2) where the steel substrate is impermeable, and a dense CGO electrolyte (3) overlapping the two and forming a gas-tight seal around the edge of the anode. When the prior art fuel cell is compared to a fuel cell in which the electrolyte layer comprises doped-ceria powder with a physical property selected from bimodal particle size distribution, a BET surface area in the range 20-40 $m^2/g$, a spherical morphology, or combinations thereof, improved densities are observed.

Figure 4:
FIG. 4 is the half-cell of FIG. 3 prior to firing, including a mass to prevent distortion of the cell during firing.

FIG. 4 shows a part with a ceramic pinning mass applied prior to sintering in order to prevent distortion due to sintering stresses.

Accordingly, in a first aspect of the invention there is provided a process for forming an electrolyte for a metal-supported solid-oxide fuel cell, the process comprising one or more of steps a-d:

a. combining a doped-ceria powder optionally with a sintering aid and solvent to form a slurry;
b. applying the slurry to an anode layer;
c. drying to form a green electrolyte; and
d. firing the green electrolyte to form a sintered electrolyte;

wherein the slurry in step b. comprises doped-ceria powder with a physical property selected from bimodal particle size distribution, a BET surface area in the range 15-40 $m^2/g$, a spherical morphology, or combinations thereof.

Often the process will comprise steps a and b and optionally one of steps c or d, often a combination of two or three or more of any of steps a to d or all of steps a to d will be used to provide a dense, gas-tight doped ceria electrolyte. In addition, the doped-ceria powder present in the slurry of step b. will often have more than one physical property selected from bimodal particle size distribution, a BET surface area in the range 20-40 m²/g, and a spherical morphology, often all three of these physical properties will be present to provide optimum densification of the electrolyte.

More specifically, it is possible to produce an electrolyte with a density of greater than 95% theoretical density, for instance in the range 95-100%, often 95.1, 97 or 98-100% density can be achieved using the process claimed. This reduces porosity and hence gas permeability, thus the electrolyte is gas-tight. Further, achieving an electrolyte density which is at such a high percentage of theoretical density ensures that the electrolyte has only very low levels of microscopic porosity, and hence is less prone to cracking (and so failure) during sintering The doped-ceria green electrolyte will often be formed from a doped-ceria with high oxygen conductivity, such as a gadolinium doped-ceria (such as $Ce_{0.9}Gd_{0.1}O_{1.95}$ (CGO10)) or a samarium doped ceria (such as $Ce_{0.9}Sm_{0.1}O_{1.95}$). Often the doped-ceria green electrolyte will be formed from CGO (gadolinium doped-ceria). In many cases the doped-ceria will initially be in the form of a powder, such that an initial process step could be the provision of a doped-ceria powder. Often the powder will have a bimodal particle size distribution, with a peak at around 0.45 μm and a peak at around 1.6 μm.

The doped-ceria powder will often be of defined surface area, to ensure good sintering of the green electrolyte layer that will be formed. Often the doped-ceria powder will have a BET surface area in the range 15-40 m²/g, more often 20-35 m²/g, still more often 24-28 m²/g. It will generally be the case that, even where milling is used, the BET surface area of the powder will be in this range. The thermodynamic driving force for sintering of the green electrolyte layer is largely driven by the available surface area, as reducing the surface area reduces the energy state of the system. Thus powders with a higher specific surface area will sinter more readily at any given temperature. However, powders with high specific surface area tend to have significant nano-scale porosity, and thus pack poorly, resulting in a low green density. In ceramics processing, the green density refers to the density of the powder compact used as a precursor to the ceramic before sintering. It is usually expressed as a percentage of the theoretical density of the same mass of ceramic material with no porosity. A green powder compact with low green density will shrink more to achieve full density. This can cause issues due to the high stresses developed in the partially sintered ceramic as is shrinks, potentially resulting in failure through cracking. There is thus a balance to be struck between using a powder with high BET specific surface area and thus sinterability, and achieving a high green density which is necessary to minimise shrinkage and avoid cracking. The range of BET surface area of the powder is selected such that it is high enough to allow sufficient sinterability of the powder, but low enough to minimise the gaps which would appear between particles of too small a size (too high an individual surface area) ensuring that a density of the green electrolyte of at least 50% theoretical density can be obtained.

Where green densities are at least 50% of theoretical density, it is easier to achieve final sintered electrolyte densities of greater than 95% theoretical density, ensuring the provision of an air tight, robust electrolyte. Using a doped-ceria powder with a BET surface area outside the specified range could result in either inadequate densification or cracking of the sintered layer.

In many cases the powder will have been manufactured by co-precipitation of a precursor to the doped-ceria from a solution of cerium nitrate with a nitrate of the dopant using a base such as ammonium carbonate. This precursor (typically doped cerium hydroxycarbonate) is then separated, dried and calcined to form the desired doped-ceria powder through thermal decomposition of the hydroxycarbonate to an amorphous oxide, followed by crystallisation. Where the doped-ceria is CGO, crystallisation will form a single-phase cubic-fluorite crystal. This method is advantageous, as it is generally desirable to use powders which have roughly spherical morphologies, and few irregularly shaped particles. Although co-precipitation methods will often be used, any method which produces particles with a roughly spherical morphology may be employed. Alternatively, the powder may be processed after manufacture to modify the particle shape, such that spherical particles are produced.

One advantage of the particles having spherical morphologies is improved packing of the particles which in turn assists in the provision of a high density electrolyte at the low (by ceramic processing standards) sintering temperatures employed in the process of the invention. The powder produced by this method has a roughly spherical morphology, hence this method of doped-ceria powder preparation is often employed. As used herein the term "roughly spherical" is intended to describe an overall morphology. As would be understood by the skilled reader, the particles are spherical to within normal tolerances and are not obviously distorted from this shape. Further, almost all of the particles will be "roughly spherical", such that, for instance, in the range 90-100% will be spherical, often 95-100%, or 98-100% of the bulk particles will have a "roughly spherical" morphology.

The slurry will generally include a sintering aid, often this will comprise a transition metal oxide (TMO) powder (most often $Co_3O_4$ or CuO) as these TMOs offer an excellent sintering enhancement. The sintering aid may be present at a level in the range 0.5-5 mol % of total cations, more often in the range 0.75-3 mol %, still more often in the range 1-2 mol %. This level balances the need to enhance densification, without altering the electrical properties of the material. In the process of the invention, the sintering aid will typically be in powder form and mixed with the doped-ceria. Where this is the case, typically it will be of particle size comparable to or smaller in size than the CGO. This ensures that the TMO can be homogeneously mixed with the CGO providing for the formation of a single phase on sintering. However, the sintering aid may also be combined with the doped-ceria powder by incorporation into the doped-ceria powder during the doped-ceria manufacturing process by co-precipitating a nitrate of the sintering aid with the Cerium nitrate and the nitrate of the dopant. Alternatively, the sintering aid can be added to the doped-ceria by doping the doped-ceria with a solution of nitrate of the sintering aid in a non-aqueous solvent such as ethanol, followed by drying and thermal decomposition to decompose the nitrate to the sintering aid. This process is not preferred due to the emission of toxic nitrogen oxides during the decomposition process, but may be used in where circumstances are such that the benefits outweigh the problems of nitrogen oxide emission. Another possible method of combining the sintering aid with the doped-ceria is mixing the doped-ceria powder with an aqueous solution of a nitrate of the sintering aid, followed by precipitation of a hydroxide or carbonate of the sintering aid using a suitable base such as sodium carbonate. The powder would then be washed, dried and calcined to decompose the carbonate or hydroxide of the sintering aid to the oxide thereof. In all cases the intention is to homogeneously mix the sintering aid with the doped-ceria, such that sintering is enhanced in a uniform manner.

In some cases, the process will further comprise the additional step of forming the doped-ceria green electrolyte from an ink. Often the ink will be a screen-printable ink, however, the skilled person would understand that inks can be applied using a wide variety of methods, including pressurised jet application or flow application. This will often be through the mixing of a doped-ceria powder with a sintering aid (although the sintering aid may be absent), and subsequent slurry formation. Optionally, to enhance dispersion of the solvent, a dispersing agent will also be present. The dispersing agent will often be present in the range 5-15% relative to the weight of the CGO. The solvent used in the slurry may be selected from a wide range of solvents suitable for making screen print inks with inorganic pigments, but will often be a solvent with low volatility (so the ink does not dry prior to deposition), limited polarity and good compatibility with the polymers required to give the ink the necessary rheological properties. Suitable solvents include, but are not limited to Texanol (2,2,4-trimethyl 1,3-pentanediol monoisobutyrate), terpineol, butyl carbitol, water and combinations thereof. Of these, water is least preferred as dispersal of the metal oxide powders is difficult due to hydrogen bond formation between the water and the hydroxide groups on the particle surfaces, causing particle agglomeration.

The slurry may have a bimodal particle size distribution, with a peak at around 0.15 µm, often in the range 0.1-0.4 µm or 0.15-0.35 µm; and a peak at around 1.0 µm, often in the range 0.5-1.5 µm or 0.75-1.25 µm (as measured using a Malvern mastersizer powder dispersed in Texanol). Often there will be a dominant peak, and often this will be the peak at around 0.3 µm, where a dominant peak is present, the secondary peak will often be the peak at around 1.0 µm. A bimodal particle size distribution, enhances the sintering of the green electrolyte to provide a dense, crack-free electrolyte layer. Without being bound by theory, we believe that this is easier to achieve with a bimodal particle size distribution than with a monomodal particle size distribution as the presence of a population of larger particles aids deposition of the particles, and hence packing and strength of the green electrolyte layer.

In some examples, the bimodal particle size distribution will be provided by milling the slurry. Typically this would be by attrition milling. Further benefits of milling the slurry include the reduction in particle size of the doped-ceria powder, and the reduction in particle size of any sintering aid present. The milling process also has the benefit of homogeneously dispersing any sintering aid present with the doped-ceria powder. Where present, the sintering aid will often be reduced in particle size to sub-micron level, for instance in the range 0.1-0.9 µm, often 0.3-0.6 µm.

The process of the invention may therefore include the additional step of milling the slurry, optionally to produce a bimodal particle size distribution. Suitable milling processes include, but are not limited to bead milling, vibro-milling, basket milling and combinations thereof. These all involve adding very hard ceramic beads to the slurry, and applying mechanical energy such that the beads continuously collide with each other, breaking down the powder as it is caught between colliding beads. Where beads are present, there may be a step of removing the beads from the slurry after milling is complete.

Optionally, organic polymers may be added to the slurry, often after milling, to convert it into a screen-printable ink. Organic polymers typically used include binders (often in the range 1-5 wt %), dispersing agents (if not added at the milling stage), surfactants (often in the range 0.05-5 wt %) to aid levelling of the print and release air bubbles from the ink during manufacture and printing, and combinations of these. The binder serves the dual role of modifying the rheology of the ink to increase its thixotropic nature, which is important for effective printing, and binding the particles together in the printed layer as it dries, preventing cracking and giving the dried green powder compact some strength. Suitable binders include, but are not limited to polyvinylbutyral (PVB) and ethyl cellulose. Suitable dispersing agents and surfactants are generally proprietary additives, supplied by companies such as Byk-Chemie, BASF, TEGO or Schwegmann. Ink formation will often require dissolution of the additives. This could be through the use of a suitable high shear dispersion mixing process such as a High Speed Disperser (HSD), although other methods may be used. The ink may be further homogenised using a triple-roll mill. The formation of an ink provides for easier deposition of the doped-ceria onto the anode layer.

It will often be the case that prior to the electrolyte/slurry deposition, that the anode layer has been applied to a metal substrate. The metal may be any metal substrate commonly used in metal-supported SOFCs, however, for this invention the metal substrate will often comprise a perforated region surrounded by a non-perforated region as described in GB 2,368,450, the disclosure thereof, in particular in relation to the fundamental construction of metal supported SOFC's of this type, is incorporated herein by reference. In these designs, the anode is positioned over the perforated region, this configuration providing for gas access to the anode through the perforated (often laser drilled) region. Often the metal substrate will be a stainless steel substrate, often ferritic stainless steel as ferritic stainless steel has a similar thermal expansion co-efficient to GDC, the most commonly used doped-ceria; thereby reducing stresses within the half-cell during heating/cooling cycles.

The green electrolyte layer will often be formed by deposit of the ink onto the anode layer. Often this will be by screen printing the ink onto the anode layer. Typically the screen printed electrolyte layer will cover the anode layer and overlap the edges of the anode layer so that the electrolyte layer covers some or all of the metal substrate not covered by the anode layer.

The anode layer will also typically have been formed by formulating an anode material as an ink, and often also deposited by screen printing. Optionally the anode layer is sintered to form a porous ceramic composite (the anode) before electrolyte deposition. However, this invention does not preclude the deposition of a green electrolyte over a green anode, and co-sintering of both layers, such that the anode layer is a green anode layer and the green anode layer and green electrolyte are sintered in a single firing step. Co-sintering can be advantageous from a manufacturing cost perspective, although often sequential sintering will be used as co-sintering can make it harder to form a high quality electrolyte layer. In some cases, the green electrolyte comprises multiple layers of electrolyte formed by applying the doped-ceria electrolyte in layers over the anode layer, with drying between the application of each layer. This provides for a thicker electrolyte to be formed, without the loss of structural control which arises from the application of a single "thick" layer onto the anode layer. Typically the electrolyte layer will be in the range 1-20 µm.

In many examples, a step of removing any solvents and organic matter from the green electrolyte, will be present, typically such removal would be after drying to form the green electrolyte, and would comprise evaporating the solvents. This step is often present where deposition is of an ink or slurry. This will often be at a temperature in the range 100-250° C., or 150-200° C. and often for a time period in the range 5-20 minutes after which the solvent will have been removed. This aspect of the process, where used, has the additional benefit of setting the binder. Typically an oven will be used to provide the heat.

This step may additionally or alternatively comprise the step of heating the green electrolyte until the organic matter has decomposed. The skilled person would understand how to achieve this, however, heating will often be to a temperature in the range 250-500° C., or 300-400° C. the temperature being maintained in this temperature range (either at a roughly constant temperature or variable within the range) until decomposition has occurred. This will often be for a time period in the range 10-60 minutes after which the organic matter will have burned/sublimed and hence removed from the green electrolyte. Typically, an oven or furnace will be used to supply the heat. The organic matter will typically comprise binder, dispersant polymer and surfactant polymer, which coat the doped-ceria particles, and particles of sintering aid where present. Decomposing the organic matter ("burn off") and so removing this from the ink to leave just the doped-ceria and any sintering aid present allows the electrolyte to be made more dense. This is because in the absence of other materials, the doped-ceria particles can be pressed closer to one another.

There may be a pressing step, in which the green electrolyte is pressed to increase the density of the green layer, and hence the fired electrolyte. This step may comprise application of a pressure in the range 50-500 MPa, often 100-400 MPa, more often 250-350 MPa. Initial densities of the deposited green electrolyte, with one or more of the physical properties claimed can be in the range approximately 20-40%. If used, pressing will be for a time period necessary to ensure that (if not already obtained through simple provision of particles of appropriate morphology, particle size distribution and/or surface area) the green electrolyte is of a density in the range 50-60% of theoretical density (for instance, in the range 50-55%). The skilled person would be able to select an appropriate time period for the pressure applied, however, pressure would often be applied for a time period in the range 0-5 minutes. Pressing is only considered if the initial density of the deposited green electrolyte is not in the range 30-60% of theoretical density, as it has been found that if these densities are not reached prior to firing the green electrolyte, the electrolyte may often not be sufficiently dense that it is gas tight and robust to cracking. To obtain gas tight, robust systems it is desirable to have densities after firing of greater than 95% theoretical density, as described above. Often, the pressure is applied using cold isostatic pressing, uniaxial bladder pressing, or a combination of these. These methods apply a uniform pressure across the surface of the green electrolyte, ensuring that a uniform density is achieved. The pressing process provides for a heavily compacted green layer.

Often the firing step will occur in a furnace, often with an air atmosphere. In some cases, there will be a heating rate of temperature increase whilst in the temperature range 800-1000° C. of in the range 5-20° C./minute, as this has been found to be advantageous in forming the electrolyte. Often, the rate will be at least 5° C./min. Often this heating rate will be applied whilst in the temperature range to 900-1100° C., more often 950-1050° C., still more often to 990-1030° C. Often the total heating period will be in the range 20-120 minutes, often 30-90 minutes, still more often 35-60 minutes, or 35-40 minutes. The rate of temperature increase of 5-20° C./minute in the temperature range 800-1000° C. has been found to offer advantages as are competing processes occurring within the electrolyte layer on the metal substrate (in particular on a steel substrate) as it sinters. The desirable process is the movement of the volatile sintering aid cations to grain boundaries within the ceramic as it densifies, where they accelerate sintering. However, there are a range of competing, undesirable, processes occurring. One of these is the complete loss of the volatile sintering aid species at high temperature, either by evaporation into the furnace atmosphere or by diffusion into the anode. Another undesirable process is the contamination of the electrolyte layer with volatile transition metal oxide species (particularly chromium oxides) evaporating from the steel. As has been disclosed elsewhere (GB 2,400,486), chromium ions are known to inhibit the sintering of doped-cerias such as CGO. If the electrolyte is allowed to spend too long at a temperature >800° C. but below the temperature at which it will fully density (typically >980° C.), the sintering aid will tend to evaporate and the level of chromium contamination will become such that the electrolyte will not then fully density. In order to achieve this rapid heat-up, a continuous belt furnace is typically used for electrolyte sintering, although a batch furnace may be used as long as sufficiently rapid heating is possible at >800° C. without resulting in an excessive spread of temperatures during the sintering dwell. This will sinter the green electrolyte into a dense, gas impermeable ceramic, generally of density at least 95% of theoretical density. As would be understood by the skilled person, the production of a gas impermeable electrolyte layer typically results in the presence of residual non-connected porosity within the electrolyte, hence the extreme difficulty in providing electrolytes with densities which fall anywhere near to 100% of theoretical, often merely in the range 50-85% theoretical. The process described herein, in particular the particle properties (particle size distribution, surface area and/or morphology) selected, remedies this problem offering electrolytes which are of extremely low porosity, and hence high density, resulting in a gas tight electrolyte layer which is far less likely to crack than those known in the art.

Further, the process may comprise the step of applying a mass to at least part of the part of the metal support onto which neither an anode nor electrode material has been applied prior to firing of the electrolyte to hold at least that part of the metal support flat during sintering of the electrolyte and/or anode. The mass can be any substance which is robust to furnace conditions, and of sufficiently great mass to prevent deformation of the metal support. Often the mass will be alumina as it is inert under furnace conditions, although any inert ceramic, or alternatively a coated metal part would work. Often, the mass will be placed on the metal support, around most if not all of the circumference of the green electrolyte, such that the metal support remains flat after sintering. For instance, the mass may cover 30-100% of the circumference of the green electrolyte, or where necessary 50-95%, often 70-90% or 90-99%. As would be understood by the skilled person, the degree of coverage is dependent on the nature of the metal support and the degree of stress to be placed upon it during sintering of the anode/electrolyte. In some cases a complete circumferential coverage may be needed, in some, only partial.

The use of the mass has been demonstrated to allow repeatable deposition of large high-quality electrolyte layers on metal-supported SOFCs, larger layers are possible as sintering the electrolyte layer on a metal support is not fully constrained sintering, due to plastic deformation of the metal support at sintering temperatures. This tends to result in sintering stresses in the ceramic layers being relieved by the deformation of the metal support. It is for this reason that it is advantageous to apply a pinning mass to the metal support during sintering to keep it flat, as otherwise the sintering stress applied to the metal support from the electrolyte may be sufficient to cause extensive curvature of the substrate due to plastic deformation of the metal support. As such the process may include the additional step of applying a mass to at least part of the part of the metal support onto which neither an anode nor electrode material has been applied prior to firing of the electrolyte to hold at least that part of the metal support flat during sintering.

In a second aspect of the invention there is provided a process for forming a fuel cell comprising forming an electrolyte on a metal-supported anode layer using the process of the first aspect of the invention, and applying a cathode material to the electrolyte.

In a third aspect of the invention, there is provided an electrolyte obtained by the process according to the first aspect of the invention.

There is further provided, in a fourth aspect of the invention, a fuel cell comprising an electrolyte according to the third aspect of the invention, and in a fifth aspect of the invention, a fuel cell stack comprising at least two fuel cells according to the fourth aspect of the invention.

In addition, in a sixth aspect of the invention there is provided the use of a fuel cell or fuel cell stack according to the fourth or fifth aspects of the invention, in the generation of electrical energy.

It could therefore be said that the invention provides a process for forming an electrolyte for a metal-supported solid-oxide fuel cell, the process optionally comprising one or more of the following:

a. combining a doped-ceria powder (typically a gadolinium doped-ceria powder) often of BET surface area in the range 15-40 $m^2$/g and/or of roughly spherical morphology, with a sintering aid, typically a TMO sintering aid, optionally of particle size in the range 1-10 μm, and a solvent to form a slurry;

b. optionally milling the slurry to optionally produce a bimodal particle size distribution of the doped-ceria powder;

c. optionally forming an ink, typically a screen-printable ink by optionally adding one or more of a dispersing agent, binder, and a surfactant to the slurry;

d. optionally applying an anode layer to a metal substrate, the metal substrate optionally comprising a perforated region surrounded by a non-perforated region, and independently optionally being a steel substrate;

e. optionally firing the anode layer;

f. applying the slurry to the anode layer, optionally in multiple layers;

g. drying to form a green electrolyte;

h. optionally removing any solvents and organic matter from the green electrolyte, optionally by evaporation of the solvents, optionally at a temperature in the range 100-250° C., optionally by decomposition of the organic matter by heating, optionally to a temperature in the range 250-500° C. and optionally for a time period in the range 5-20 minutes;

i. optionally pressing the green electrolyte to increase green electrolyte density, optionally by application of a pressure in the range 50-500 MPa, pressure optionally being applied using cold isostatic pressing, uniaxial bladder pressing, or a combination of these;

j. optionally applying a mass to at least part of the part of the metal support onto which neither an anode nor electrode material has been applied to hold at least that part of the metal support flat during sintering of the electrolyte; and k. firing the green electrolyte to form a sintered electrolyte, optionally at a rate of temperature increase whilst in the temperature range 800-1000° C. of in the range 5-20° C./minute optionally for a total heating period in the range 20-120 minutes.

Unless otherwise stated each of the integers described may be used in combination with any other integer as would be understood by the person skilled in the art. Further, although all aspects of the invention preferably "comprise" the features described in relation to that aspect, it is specifically envisaged that they may "consist" or "consist essentially" of those features outlined in the claims. In addition, all terms, unless specifically defined herein, are intended to be given their commonly understood meaning in the art.

Further, in the discussion of the invention, unless stated to the contrary, the disclosure of alternative values for the upper or lower limit of the permitted range of a parameter, is to be construed as an implied statement that each intermediate value of said parameter, lying between the smaller and greater of the alternatives, is itself also disclosed as a possible value for the parameter.

In addition, unless otherwise stated, all numerical values appearing in this application are to be understood as being modified by the term "about".

EXAMPLES

Evidence that the fuel cell of the invention is gas tight can be provided by placing the half-cell onto a helium leak detector. If the gas permeability of the electrolyte is below a defined threshold, the number and size of microscopic defects in the sintered layer is acceptable, and a gas tight layer has been achieved. It has been found that the electrolyte needs to be >95% dense to ensure that the gas permeability is below the operational threshold.

Figure 5:
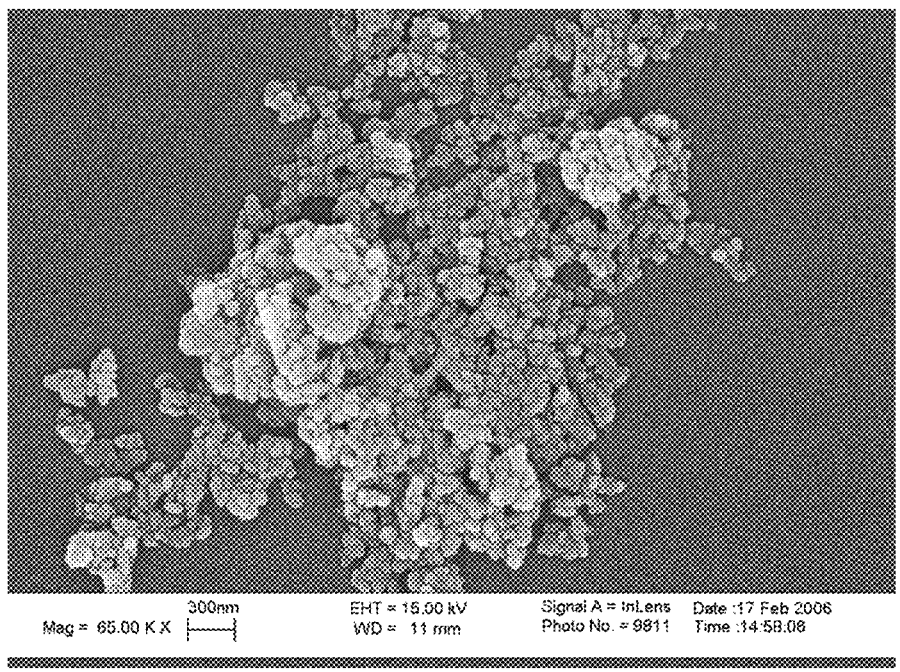
FIG. 5 is a SEM image of a CGO powder with spherical morphology for use in the invention.
Figure 6:
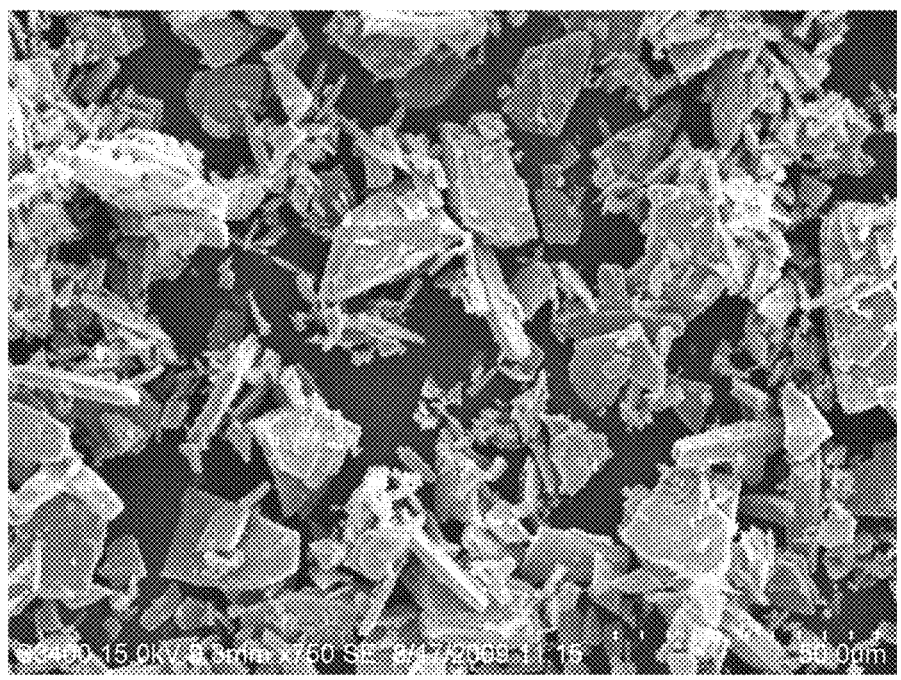
FIG. 6 is a SEM image of a CGO powder with non-spherical morphology.

FIG. 5 shows a CGO powder for use in the processes of the invention. The as-received powder had a BET surface area in the range 20-40 $m^2$/g. The powder was manufactured by co-precipitation of a precursor from a solution of cerium and gadolinium nitrates using a base such as ammonium carbonate. This precursor of cerium gadolinium hydroxycarbonate was then separated, dried and calcined to form the desired CGO powder through thermal decomposition of the hydroxycarbonate to an amorphous oxide, followed by crystallisation to form the desired single-phase cubic-fluorite crystal structure. As can be seen in FIG. 5, the powder produced has an approximately spherical morphology, with few irregularly-shaped particles. Other morphologies are available, as shown in FIG. 6, which has a clearly non-spherical morphology and exhibits poor packing in use. This poor packing results in the sintered density of the electrolyte layer being less than the 95% that we have found is required to ensure that the gas permeability is below the operational threshold.

Figure 7:
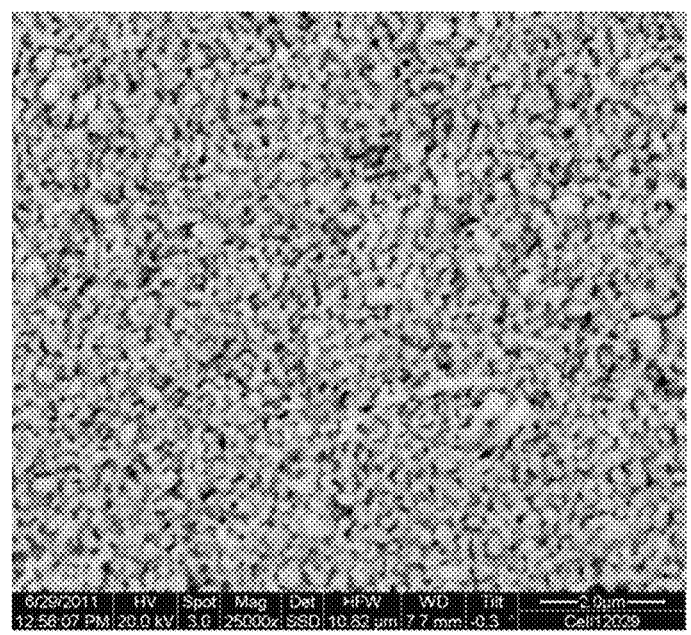
FIG. 7 is a SEM image of a sintered electrolyte formed from a CGO powder of BET surface area less than 20 $m^2/g$.
Figure 8:
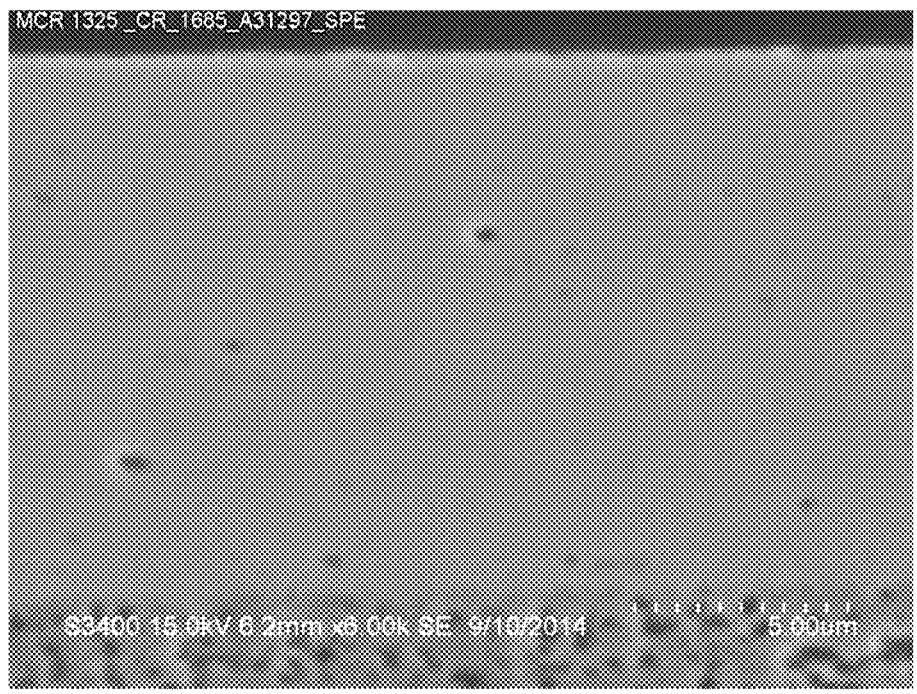
FIG. 8 is a SEM image of a sintered electrolyte formed from a CGO powder of BET surface area in the range 20-40 $m^2/g$.
Figure 9:
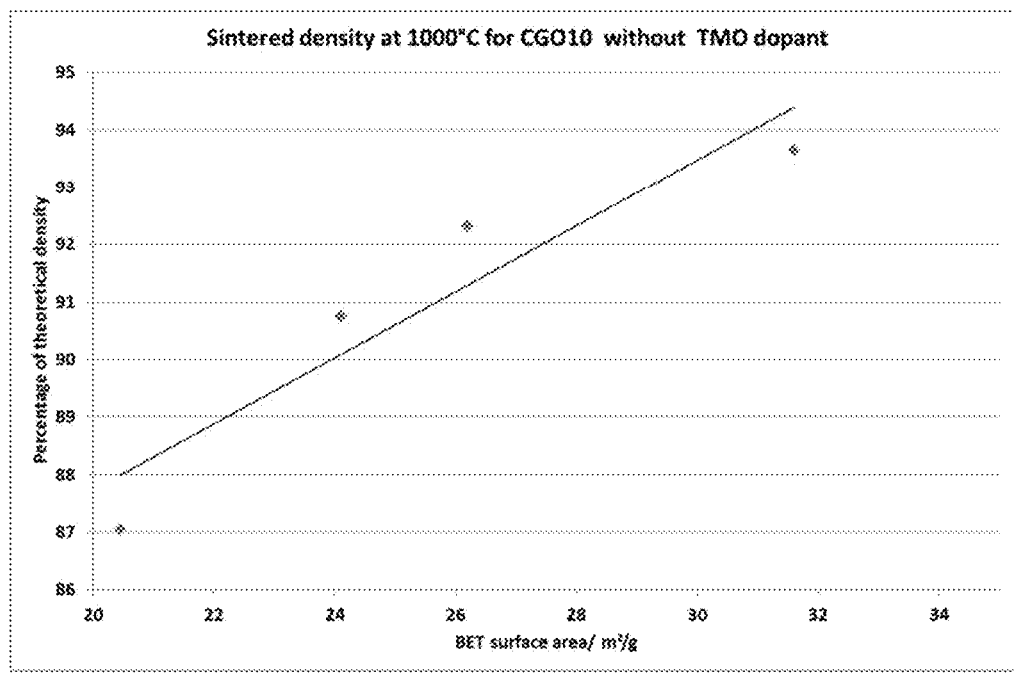
FIG. 9 is a graph showing the sintered density of the undoped (i.e. no transition metal addition) powder measured using a pushrod dilatometer with a heating rate of 10° C./min in air. The sintered density values are instantaneous values on a ramp from room temperature to 1100° C.

FIG. 7 shows a sintered electrolyte of less than 95% density, resulting from the sintering of particles where the BET surface area is less than 20 $m^2$/g. As can be seen, sintering is poor and a gas impermeable layer is not obtained. This is compared to the sintered electrolyte of FIG. 8, which is of greater than 95% density and is free of macroscopic defects, such as cracks. FIG. 9 shows the relationship between BET surface area and density.

A slurry of the powder of FIG. 5 was then formed and the powder milled, using bead milling at a specific energy of 200

Figure 10:
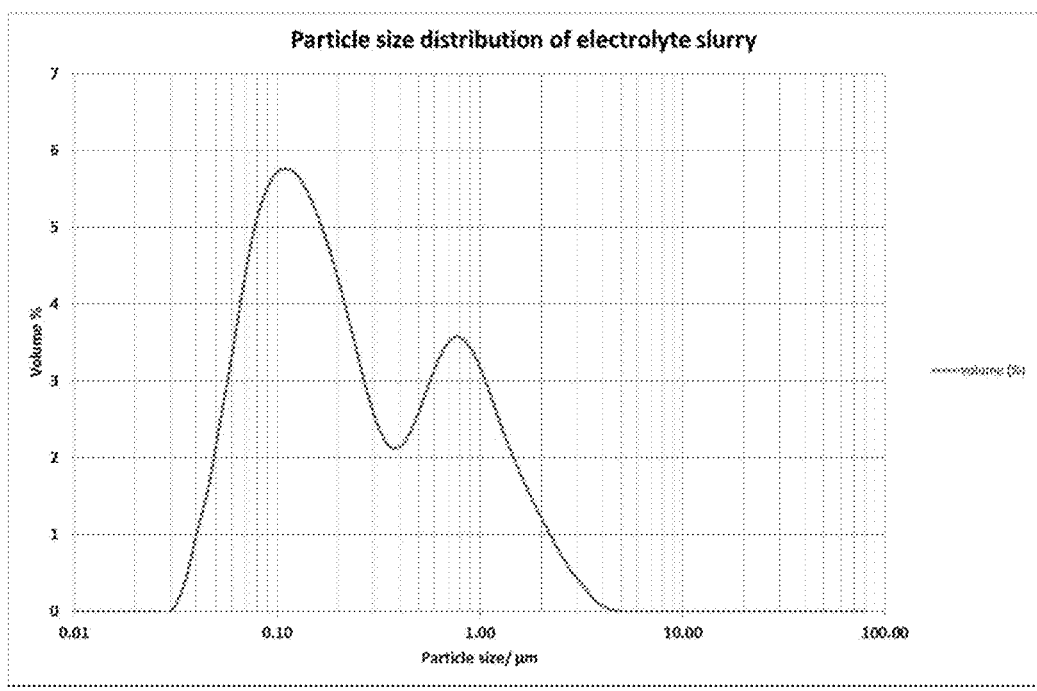
FIG. 10 is a graph illustrating a bimodal particle size distribution for use in the invention.
Figure 11:
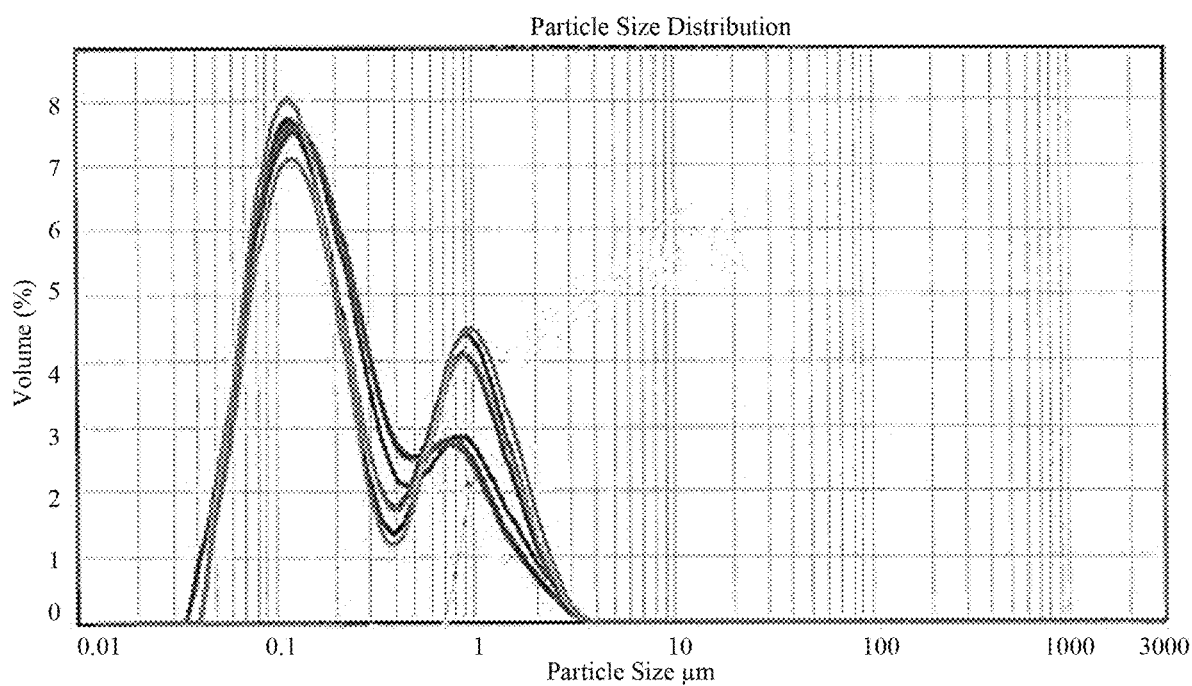
FIG. 11 is a graph illustrating a comparison between a bimodal particle size distribution for use in the invention, and a near monomodal particle size distribution.
Figure 12:
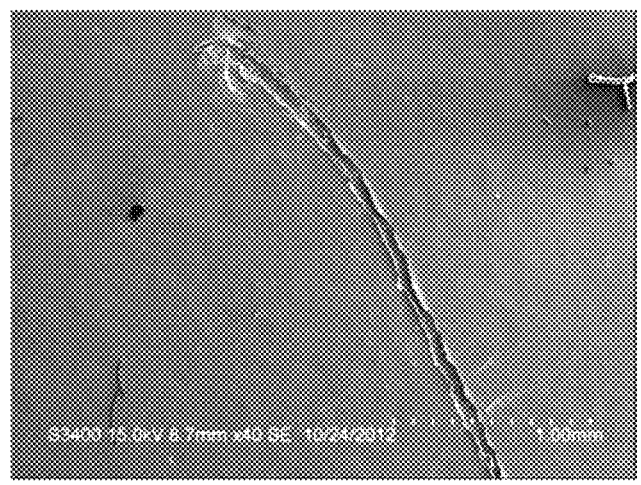
FIG. 12 is a SEM image of an electrolyte layer comprising particles of less well defined particle size distribution, as shown in Figure B.

Wh/kg of slurry. The resulting powder had a bimodal particle distribution as shown in FIG. 10. It has been found, that the larger particles in the bimodal distribution aid packing and strength of the green electrolyte layer. Where the bimodal distribution is not as in FIG. 10, for instance, as shown in FIG. 11, in which the test with the more monomodal distribution (the lower curves on the Figure), resulted in cracking on sintering as shown in FIG. 12.

The results described above, are summarised in Table 1 below, these results clearly show the importance of controlling surface area, particle size distribution and morphology in the production of a gas impermeable, crack free electrolyte layer.

TABLE 1

| Electrolyte parameter | Sintered electrolyte uncracked | Sintered electrolyte >95% dense |
|---|---|---|
| BET surface area <20 m$^2$/g | Y | N |
| BET surface area >40 m$^2$/g | N | Y |
| Monomodal PSD | N | Y |
| Bimodal PSD | Y | Y |
| Spherical morphology | Y | Y |
| Non-spherical morphology | N | N |

The process described herein has been demonstrated to allow repeatable deposition of high-quality electrolyte layers on metal-supported SOFCs, with a surface area of up to 108 cm$^2$. Larger layers may be possible, as sintering the electrolyte layer on a steel support is not fully constrained sintering, due to plastic deformation of the metal support at sintering temperatures. This tends to result in sintering stresses in the ceramic layers being relieved by the deformation of the steel.

It should be appreciated that the processes and apparatus of the invention are capable of being implemented in a variety of ways, only a few of which have been illustrated and described above.

The invention claimed is:

1. A process of forming a structure including an electrolyte and an anode layer for a metal-supported solid-oxide fuel cell, the process comprising:
   a. providing a metal-supported anode layer comprising a metal substrate having an anode layer deposited thereon;
   b. combining a doped-ceria powder with a sintering aid and solvent to form a slurry;
   c. applying the slurry to the anode layer, wherein the slurry comprises doped-ceria powder with a bimodal particle size distribution;
   d. drying to form a green electrolyte;
   e. placing a mass on at least a part of the metal substrate to hold at least the part of the metal substrate flat during a step of firing the green electrolyte; and
   f. firing the green electrolyte in air at a sintering temperature that is less than 1100° C. to form a sintered electrolyte overlying the metal substrate and the anode layer thereon,
   wherein the metal substrate comprises a stainless steel foil substrate comprising a perforated region surrounded by a non-perforated region.

2. The process according to claim 1, further comprising: attrition milling the slurry prior to application to the anode layer.

3. The process according to claim 1, wherein the bimodal particle size distribution comprises particles forming a peak in a range 0.1-0.4 µm and a peak in a range 0.5-1.5 µm.

4. The process according to claim 1, wherein the sintering aid is present in a range 0.5-5 mol % total cations.

5. The process according to claim 1, further comprising: forming the green electrolyte from a screen-printable ink.

6. The process according to claim 1, wherein the green electrolyte comprises multiple layers of electrolyte formed by applying the slurry in layers over the anode layer, with drying between the application of each layer.

7. The process according to claim 1, wherein the anode layer is a sintered anode layer.

8. The process according to claim 1, wherein the anode layer is a green anode layer and the green anode layer and green electrolyte are sintered in a single firing step.

9. The process according to claim 1, wherein the green electrolyte covers the anode layer and the metal substrate.

10. The process according to claim 1, further comprising: pressing after application of the slurry to the anode layer, but prior to firing of the green electrolyte.

11. A process for forming a fuel cell, comprising:
   forming an electrolyte on a metal-supported anode layer using the process of claim 1, and
   applying a cathode material to the electrolyte.

12. A fuel cell comprising an electrolyte obtained by the process according to claim 1.

13. A fuel cell stack comprising at least two fuel cells according to claim 12.

14. The process according to claim 1, wherein the doped-ceria powder has a BET surface area in a range 15-40 m$^2$/g.

15. The process according to claim 1, wherein the doped-ceria powder has a spherical morphology.

16. The process according to claim 1, wherein the slurry in step c. comprises doped-ceria powder with a bimodal particle size distribution, a BET surface area in a range 15-40 m$^2$/g and a spherical morphology.

* * * * *